United States Patent
Kakade et al.

(10) Patent No.: US 11,958,339 B2
(45) Date of Patent: Apr. 16, 2024

(54) CONCEALED AIR VENT APPARATUS IN VEHICLE AND A METHOD THEREOF

(71) Applicant: MAHINDRA & MAHINDRA LIMITED, Tamil Nadu (IN)

(72) Inventors: Ritesh Kakade, Tamil Nadu (IN); Prashant Pandey, Tamil Nadu (IN); Srinath Jayan, Tamil Nadu (IN)

(73) Assignee: MAHINDRA & MAHINDRA LIMITED, Tamilnadu (IN)

( * ) Notice: Subject to any disclaimer, the term of this patent is extended or adjusted under 35 U.S.C. 154(b) by 730 days.

(21) Appl. No.: 16/980,415

(22) PCT Filed: Nov. 29, 2018

(86) PCT No.: PCT/IN2018/050798
§ 371 (c)(1),
(2) Date: Sep. 13, 2020

(87) PCT Pub. No.: WO2019/175894
PCT Pub. Date: Sep. 19, 2019

(65) Prior Publication Data
US 2021/0001693 A1 Jan. 7, 2021

(30) Foreign Application Priority Data
Mar. 13, 2018 (IN) .............................. 201841009253

(51) Int. Cl.
*B60H 1/34* (2006.01)
*B60H 1/00* (2006.01)

(52) U.S. Cl.
CPC ....... *B60H 1/3421* (2013.01); *B60H 1/00657* (2013.01); *B60H 2001/3478* (2013.01)

(58) Field of Classification Search
CPC ............. B60H 1/3421; B60H 1/00657; B60H 2001/3478
(Continued)

(56) References Cited

U.S. PATENT DOCUMENTS 5,620,366 A * 4/1997 Munzel .................. B60H 1/242
454/152
6,749,656 B2 * 6/2004 Paumier ............... B60H 1/3407
264/DIG. 48
(Continued)

FOREIGN PATENT DOCUMENTS

DE 3927217 C1 * 8/1990 ............... B60H 1/34
EP 3228948 A1 * 10/2017 ............... F24F 13/06

*Primary Examiner* — Avinash A Savani
*Assistant Examiner* — Dana K Tighe
(74) *Attorney, Agent, or Firm* — HAUPTMAN HAM, LLP

(57) ABSTRACT

Concealed air vent apparatus in a vehicle and a method thereof is provided. The apparatus includes an air vent casing, at least one air directing flap, at least one air diffusing flap, at least one closing flap, an air directing flap actuator, an air diffusing flap actuator and a closing flap actuator. The air diffusing flap actuator is adapted to move air diffusing flap to a diffused position in which a plurality of air diffusing portions of air diffusing flap is adapted to facilitate uniform distribution of air to an occupant compartment. The closing flap actuator is adapted to move closing flap between an open position in which closing flap is adapted to allow air flow to the occupant compartment, and a closed position in which closing flap is adapted to restrict air flow to the occupant compartment.

9 Claims, 4 Drawing Sheets

(58) Field of Classification Search
USPC .......................................................... 454/155
See application file for complete search history.

(56) References Cited

U.S. PATENT DOCUMENTS

| | | | | |
|---|---|---|---|---|
| 6,830,511 | B2* | 12/2004 | Gehring | ............... B60H 1/3421 |
| | | | | 454/155 |
| 6,840,852 | B2* | 1/2005 | Gehring | ................ F24F 13/062 |
| | | | | 454/153 |
| 6,918,262 | B2* | 7/2005 | Kamiya | ................. B60H 1/247 |
| | | | | 62/316 |
| 6,966,829 | B1* | 11/2005 | Hier | ....................... B60H 1/247 |
| | | | | 296/70 |
| 6,986,829 | B2* | 1/2006 | Gehr | ........................ D21D 5/04 |
| | | | | 162/57 |
| 7,364,187 | B2* | 4/2008 | Dietze | .................. B60H 1/0055 |
| | | | | 280/732 |
| 2009/0036046 | A1* | 2/2009 | Gehring | .............. B60H 1/3407 |
| | | | | 454/162 |
| 2010/0068982 | A1* | 3/2010 | Guerreiro | ................ B60H 1/34 |
| | | | | 454/152 |
| 2016/0039389 | A1* | 2/2016 | Kato | ...................... B60H 1/345 |
| | | | | 454/155 |
| 2016/0121697 | A1* | 5/2016 | Yamamoto | ............ F24F 13/081 |
| | | | | 454/155 |
| 2019/0047376 | A1* | 2/2019 | Demerath | ............ B60H 1/3421 |

* cited by examiner

CONCEALED AIR VENT APPARATUS IN VEHICLE AND A METHOD THEREOF

RELATED APPLICATIONS

The present application is a national phase of International Application Number PCT/IN2018/050798 filed Nov. 29, 2018, and claims priority to India Application Number 201841009253 filed Mar. 13, 2018.

CROSS REFERENCE TO RELATED APPLICATION

This application is based on and derives the benefit of Indian Provisional Application 201841009253 filed on 13 Mar. 2018, the contents of which are incorporated herein by reference.

TECHNICAL FIELD

The embodiments herein relate to a concealed air vent apparatus for a HVAC system in a vehicle, and a method for providing and operating the concealed air vent apparatus in the vehicle.

BACKGROUND

Generally, heating, ventilation and air conditioning system (hereinafter called as HVAC system) in a vehicle is used to clean, cool, warm, regulate, ventilate and dehumidify the air entering a cabin of the vehicle thereby enhancing the comfort level of occupants in the vehicle. Typically, HVAC system comprises an air conditioner unit for cooling or conditioning the air entering the cabin of the vehicle and a cabin heater for warming the air entering the cabin. In conventional vehicles, air vents are provided to a dashboard (instrumental panel) at a fixed location and is visible to the occupants in the vehicle. The air vents are controlled mechanically through knobs which are operated by the occupants to receive the air towards corresponding occupant or to the desired location of the occupant by changing the angle and position of flaps provided on air vents. The air ducts are connected between the air vents and an air blower of the HVAC system to provide cool air or warm air to the cabin. Usually, the passenger and the driver tend to adjust two or three air vents to receive the cool air or warm air that is discharged towards them. The air vents should be located towards the respective occupant seating location or to the desired location of the occupant, for better discharging of air. However, packaging and arranging the air vents to corresponding occupant seating location or the desired location of the corresponding occupants is complex and is one of the challenges posed to the original equipment manufacturers (OEM). Further, the air from the air vents is not uniformly distributed in the occupant compartment.

Therefore, there exists a need for a concealed air vent apparatus for a HVAC system in a vehicle, which obviates the aforementioned drawbacks. Further, there exists a need for a method for providing and operating a concealed air vent apparatus in a vehicle.

OBJECTS

The principal object of an embodiment is to provide a concealed air vent apparatus for a HVAC system in a vehicle.

Another object of an embodiment is to provide a method for providing and operating a concealed air vent apparatus in a vehicle.

Another object of an embodiment of this invention is to provide a concealed multimode air vent apparatus for a HVAC system in a vehicle, which enhances comfort of the occupants in the vehicle.

Another object of an embodiment of this invention is to provide a concealed air vent apparatus for a HVAC system in a vehicle, in which air vent controls are operated electronically through a user interface (UI) unit.

These and other objects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments of the invention are illustrated in the accompanying drawings, throughout which like reference letters indicate corresponding parts in the various figures. The embodiments herein will be better understood from the following description with reference to the drawings, in which.

DETAILED DESCRIPTION

Figure 1:
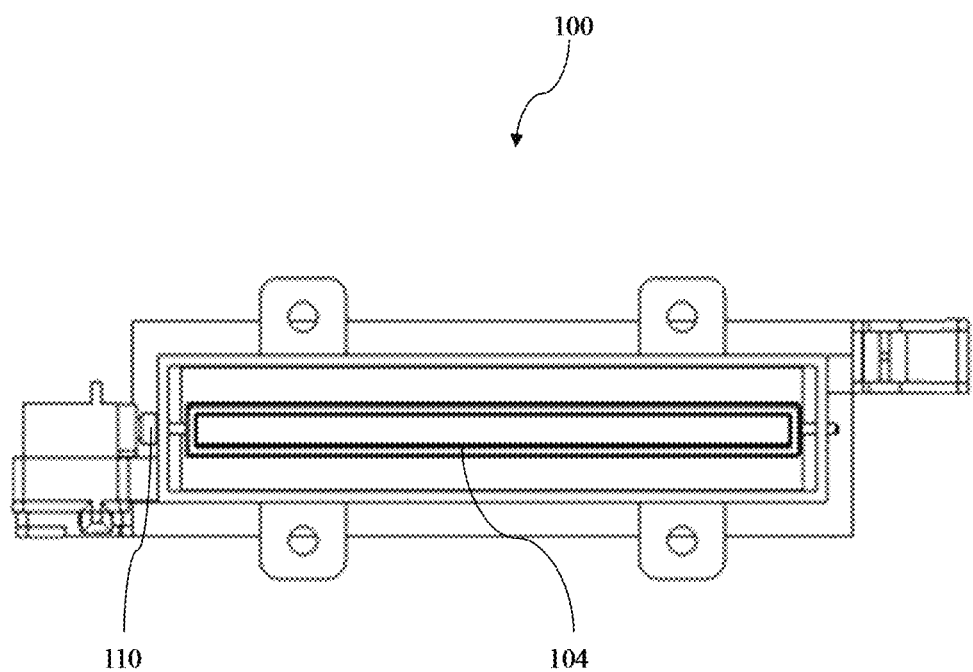
FIG. 1 depicts a front view of the concealed air vent apparatus, where the apparatus is in an air directing mode, according to an embodiment of the invention as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a concealed air vent apparatus for a HVAC system in a vehicle. Further, embodiments herein achieve a method for providing and operating a concealed air vent apparatus in a vehicle. Referring now to the drawings, and more particularly to FIGS. 1 through 4, where similar reference characters denote corresponding features consistently throughout the figures, there are shown embodiments.

FIG. 1 depicts a front view of the concealed air vent apparatus 100, where the apparatus 100 is in an air directing mode, according to an embodiment of the invention as disclosed herein. In an embodiment, the air vent apparatus 100 is concealed in a vehicular structure. The air vent apparatus 100 is used to provide cool air or warm air to an occupant compartment of the vehicle and is not visible to the occupants in the vehicle. In an embodiment, the concealed air vent apparatus 100 includes an air vent casing 102, at least one air directing flap 104, at least one air diffusing flap 106, at least one closing flap 108, an air directing flap actuator 110, an air diffusing flap actuator 112 and a closing flap actuator 114. For the purpose of this description and ease of understanding, the air vent apparatus 100 is concealed in an instrumental panel of a passenger vehicle. However, it is also within the scope of the invention to conceal the air vent apparatus 100 in roof structure or door panel or any other vehicular structure of a commercial vehicle or any other type of vehicle. The concealed air vent apparatus 100 is operated in three modes which include a directed mode, a diffused mode and a closed mode. In directed mode, the air from the concealed air vent apparatus 100 is directed in selective directions in occupant compartment according to user requirement. In diffused mode, the air from the concealed air vent apparatus 100 is distributed uniformly across the occupant compartment. In closed mode, the concealed air vent apparatus 100 is adapted restrict the air flow to the occupant compartment.

The air vent casing 102 is used to house and support the air directing flap 104, the air diffusing flap 106 and the closing flap 108.

The air directing flap 104 is used to direct the air flow in selective directions in occupant compartment according to user requirement. In an embodiment, the air directing flap 104 is angularly moved by the air directing flap actuator 110 at a plurality of air directing positions to direct air flow to the user according to user requirement. In another embodiment, the air directing flap 104 is moved manually through a control knob arrangement.

Figure 2:
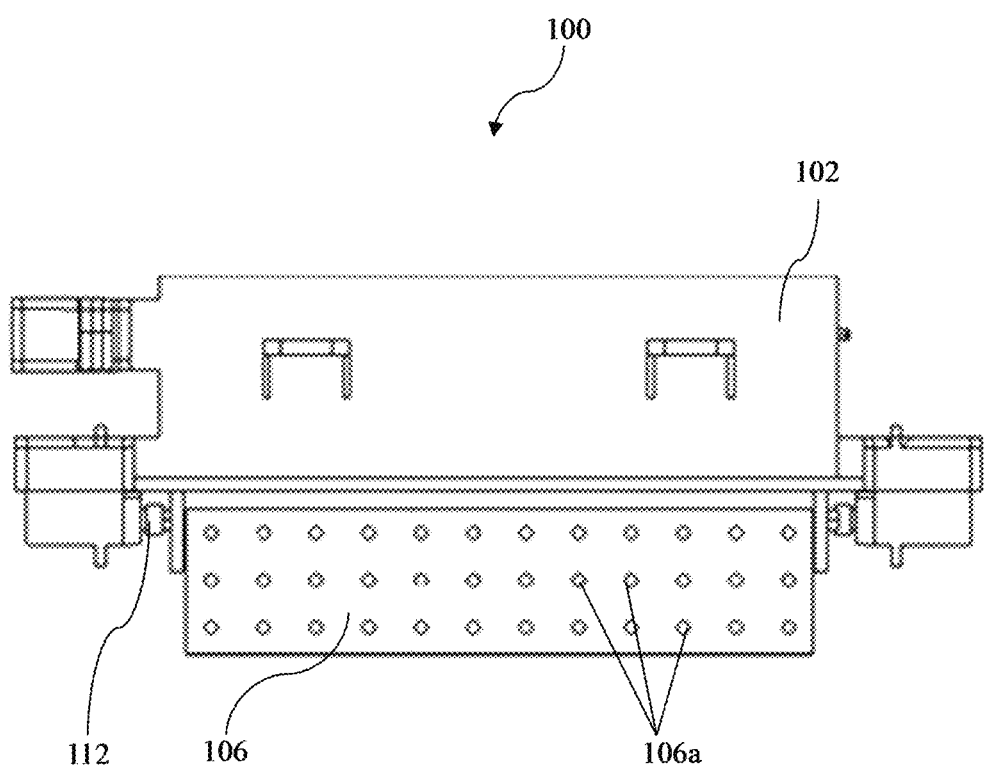
FIG. 2 depicts a top view of the concealed air vent apparatus, where an air diffusing flap is in an open position, according to an embodiment of the invention as disclosed herein.
Figure 3:
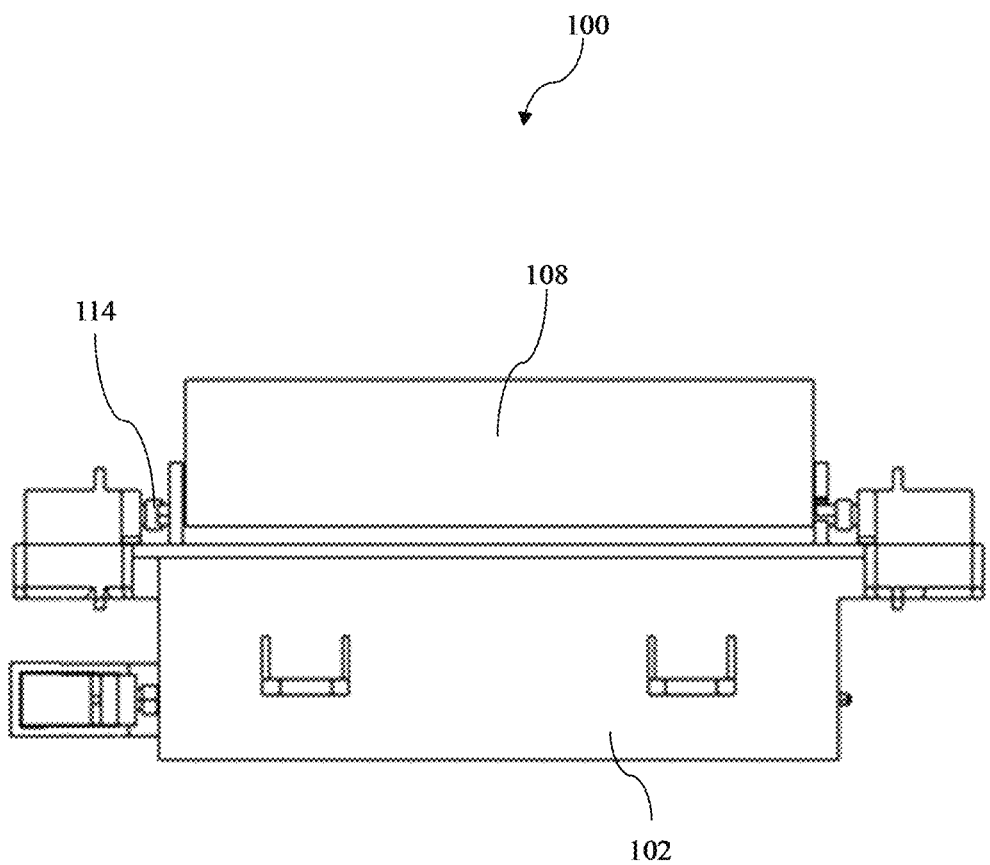
FIG. 3 depicts a top view of the concealed air vent apparatus, where a closing flap is in an open position, according to an embodiment of the invention as disclosed herein.

In an embodiment, the air diffusing flap 106 is adapted to distribute the air flow uniformly in the occupant compartment. In an embodiment, the air diffusing flap 106 defines a plurality of air diffusing portions 106a (as shown in FIG. 2) adapted to facilitate uniform distribution of air inside the occupant compartment of the vehicle. For the scope of description and ease of understanding, at least a portion of each air diffusing portion 106a of the air diffusing flap 106 substantially defines at least a cone shape configuration. However, it is also within the scope of the invention to provide each air diffusing portion of the air diffusing flap 106 in any other shape and any other configuration without otherwise deterring the intended function of each air diffusing portion of the air diffusing flap 106 as can be deduced from the description and corresponding drawings. Further, it is also within the scope of the invention to air diffusing element attached to the air diffusing portions 106a of the air diffusing flap 106 for uniform distribution of air inside the occupant compartment of the vehicle. The air diffusing flap 106 is moved by the air diffusing flap actuator 112 to an air diffusing position to facilitate uniform distribution of air to an occupant compartment of the vehicle.

In an embodiment, the closing flap 108 is adapted to restrict the air flow to the occupant compartment. The closing flap 108 is movable between an open position in which the closing flap 108 is adapted to allow air flow to the occupant compartment, and a closed position in which the closing flap 108 is adapted to restrict air flow to the occupant compartment.

The air diffusing flap 106 and the closing flap 108 are co-planar to each other. The air directing flap 104 is disposed opposite to the air diffusing flap 106 and the closing flap 108.

The air directing flap actuator 110 is coupled to the air directing flap 104 and adapted to move the air directing flap 104 based on the input received from a controller unit (not shown). The air directing flap actuator 110 is at least an electric motor.

The air diffusing flap actuator 112 is coupled to the air diffusing flap 106. The air diffusing flap actuator 112 is adapted to receive an input from the controller unit (not shown) and accordingly moves the air diffusing flap 106 to the air diffusing position in which the plurality of air diffusing portions 106a of the air diffusing flap 106 is adapted to facilitate uniform distribution of air to the occupant compartment of the vehicle. The air diffusing flap actuator 112 is at least an electric motor.

The closing flap actuator 114 is coupled to the closing flap 108. The closing flap actuator 114 is adapted to receive an input from the controller unit and accordingly moves the closing flap 108 between an open position in which said closing flap 108 is adapted to allow air flow to the occupant compartment, and a closed position in which said closing flap 108 is adapted to restrict air flow to the occupant compartment.

The controller unit is adapted to receive the user defined inputs from at least one of a user interface unit (not shown) and an electronic device, and accordingly actuates at least one of the air directing flap actuator 110, the air diffusing flap actuator 112 and the closing flap actuator 114 based on the user requirement. The user interface unit is connected to the instrumental panel of the vehicle. The user interface unit is at least a touchscreen having a plurality of air vent control icons. The electronic device is at least one of a smartphone and a computing means. In an embodiment, a smartphone based application provides user defined inputs to the controller unit. In another embodiment, the controller unit is configured to identify the user in the vehicle through user identification modules such as fingerprint access, and accordingly the controller unit actuates at least one of the air directing flap actuator 110, the air diffusing flap actuator 112 and the closing flap actuator 114.

Figure 4:
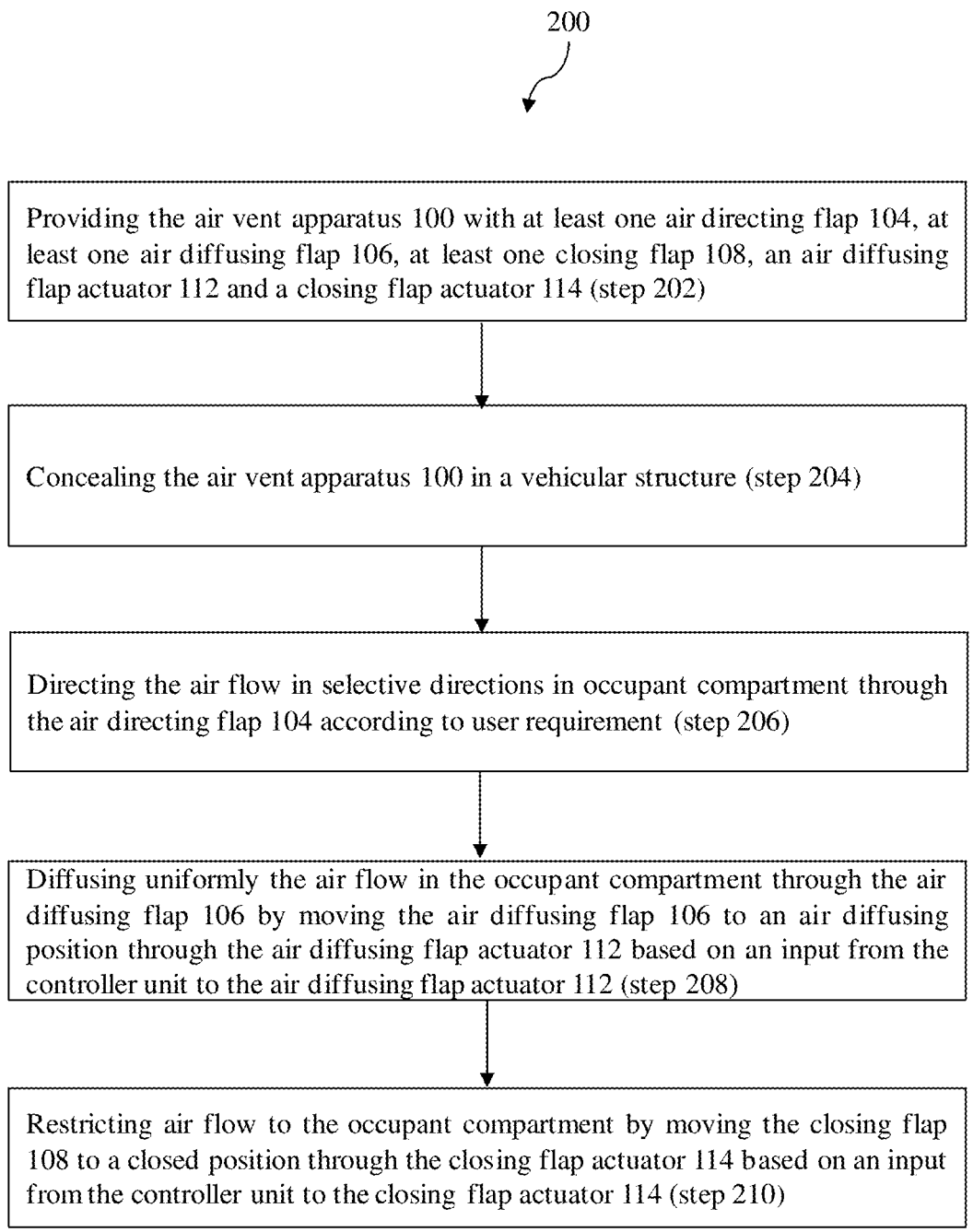
FIG. 4 depicts a flowchart showing the steps of a method for providing and operating a concealed air vent apparatus in a vehicle, according to an embodiment of the invention as disclosed herein.

FIG. 4 depicts a flowchart showing the steps of a method 200 for providing and operating an air vent apparatus 100 in a vehicle, according to an embodiment of the invention as disclosed herein. The method 200 for providing and operating the air vent apparatus 100, includes providing the air vent apparatus 100 with at least one air directing flap 104, at least one air diffusing flap 106, at least one closing flap 108, an air diffusing flap actuator 112 and a closing flap actuator 114 (step 202), concealing the air vent apparatus 100 in a vehicular structure (step 204), directing the air flow in selective directions in occupant compartment through the air directing flap 104 according to user requirement (step 206), diffusing uniformly the air flow in the occupant compartment through the air diffusing flap 106 by moving the air diffusing flap 106 to an air diffusing position through the air diffusing flap actuator 112 based on an input from the controller unit to the air diffusing flap actuator 112 (step 208) and restricting air flow to the occupant compartment by moving the closing flap 108 to a closed position through the closing flap actuator 114 based on an input from the controller unit to the closing flap actuator 114 (step 210).

Further, the method 200 includes providing user defined inputs to the controller unit through at least one of an user interface unit and an electronic device, and accordingly the controller unit actuates at least one of the air directing flap actuator 110, the air diffusing flap actuator 112 and the closing flap actuator 114 based on the user requirement.

Therefore, a concealed multimode air vent apparatus 100 for a vehicle is provided. Further, a method for providing and operating an air vent apparatus 100 in a vehicle is provided.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A concealed air vent apparatus for a vehicle, said apparatus comprising:
    at least one air directing flap;
    at least one air diffusing flap having a plurality of air diffusing portions;
    at least one closing flap;
    an air diffusing flap actuator adapted to be coupled to said at least one air diffusing flap; and
    a closing flap actuator adapted to be coupled to said at least one closing flap,
    wherein
    said at least one air directing flap is adapted to direct an air flow in selective directions in an occupant compartment according to a user requirement;
    said air diffusing flap actuator is configured to receive input from a controller unit and accordingly moves said at least one air diffusing flap to a diffused position in which the plurality of air diffusing portions of said at least one air diffusing flap is adapted to facilitate uniform distribution of air to the occupant compartment of the vehicle;
    said closing flap actuator is configured to receive input from the controller unit and accordingly moves said at least one closing flap between an open position in which said at least one closing flap is adapted to allow the air flow to the occupant compartment, and a closed position in which said at least one closing flap is adapted to restrict the air flow to the occupant compartment; and
    the controller unit is configured to receive inputs from at least one of a user interface unit and an electronic device, and accordingly actuate at least one of said air directing flap actuator, said air diffusing flap actuator and said closing flap actuator based on the user requirement, wherein,
    the user interface unit is at least a touchscreen having a plurality of air vent control icons and the electronic device is at least one of a smartphone or a computing means.

2. The apparatus as claimed in claim 1, wherein said at least a portion of each of said plurality of air diffusing portions of said at least one air diffusing flap substantially defines at least a cone shape configuration.

3. The apparatus as claimed in claim 2, wherein said at least one air diffusing flap and said at least one closing flap are co-planar to each other.

4. The apparatus as claimed in claim 1 comprising an air directing flap actuator configured to receive input from the controller unit and accordingly move said at least one air directing flap to a plurality of air directing positions according to the user requirement.

5. The apparatus as claimed in claim 4, wherein said at least one air directing flap is disposed opposite to said at least one air diffusing flap and said at least one closing flap.

6. The apparatus as claimed in claim 5, wherein said at least one air directing flap is adapted to be moved manually through a control knob arrangement to direct the air flow in selective directions in the occupant compartment according to the user requirement.

7. The apparatus as claimed in claim 5, wherein said air directing flap actuator, said air diffusing flap actuator and said closing flap actuator are at least electric motors.

8. The apparatus as claimed in claim 1 is configured to be concealed in at least an instrumental panel of the vehicle.

9. A method for providing and operating an air vent apparatus in a vehicle, said method comprising:
    providing the air vent apparatus with at least one air directing flap, at least one air diffusing flap, at least one closing flap, an air diffusing flap actuator and a closing flap actuator;
    concealing the air vent apparatus in a vehicular structure;
    directing an air flow in selective directions in an occupant compartment through the at least one air directing flap according to a user requirement;
    diffusing uniformly the air flow in the occupant compartment through the at least one air diffusing flap by moving the air diffusing flap to an air diffusing position through the air diffusing flap actuator based on an input from a controller unit to the air diffusing flap actuator;
    restricting the air flow to the occupant compartment by moving the at least one closing flap to a closed position through the closing flap actuator based on an input from the controller unit to the closed flap actuator; and
    providing user defined inputs to the controller unit through at least one of a user interface unit and an electronic device, and accordingly the controller unit actuates at least one of an air directing flap actuator, the air diffusing flap actuator and the closing flap actuator based on the user requirement
    wherein,
    the user interface unit is at least a touchscreen having a plurality of air vent control icons and the electronic device is at least one of a smartphone or a computing means.

* * * * *